United States Patent
Johnson et al.

(10) Patent No.: US 8,346,775 B2
(45) Date of Patent: Jan. 1, 2013

(54) MANAGING INFORMATION

(75) Inventors: Sandra K. Johnson, Cary, NC (US);
Grant D. Miller, Superior, CO (US);
Robert F. Pryor, Lynn Haven, FL (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 12/872,819

(22) Filed: Aug. 31, 2010

(65) Prior Publication Data

US 2012/0054185 A1    Mar. 1, 2012

(51) Int. Cl.
*G06F 17/30* (2006.01)
(52) U.S. Cl. .................................. 707/739; 707/812
(58) Field of Classification Search ........... 707/739, 707/812, E17.005
See application file for complete search history.

(56) References Cited

U.S. PATENT DOCUMENTS

| | | | |
|---|---|---|---|
| 5,333,316 A | 7/1994 | Champagne et al. | |
| 5,442,780 A | 8/1995 | Takanashi et al. | |
| 5,548,749 A | 8/1996 | Kroenke et al. | |
| 5,734,887 A | 3/1998 | Kingberg et al. | |
| 5,819,086 A | 10/1998 | Kroenke | |
| 5,950,190 A | 9/1999 | Yeager et al. | |
| 6,018,742 A | 1/2000 | Herbert, III | |
| 6,691,132 B2 | 2/2004 | Walker et al. | |
| 7,660,814 B2 | 2/2010 | Lee et al. | |
| 7,676,485 B2 | 3/2010 | Elfayoumy et al. | |
| 7,945,600 B1 * | 5/2011 | Thomas et al. | 707/804 |
| 2002/0049705 A1 | 4/2002 | Haviv-Segal et al. | |
| 2004/0139059 A1 * | 7/2004 | Conroy et al. | 707/3 |
| 2006/0167930 A1 * | 7/2006 | Witwer et al. | 707/102 |
| 2007/0011151 A1 | 1/2007 | Hagar et al. | |
| 2007/0050356 A1 | 3/2007 | Amadio | |
| 2009/0193004 A1 | 7/2009 | Reynolds, Jr. et al. | |
| 2009/0276396 A1 | 11/2009 | Gorman et al. | |
| 2010/0070448 A1 | 3/2010 | Omoigui | |

OTHER PUBLICATIONS

Prasad et al., "Virtual Database Technology, XML, and the Evolution of the Web", pp. 1-5, 1998 Bulletin of the IEEE Computer Society Technical Committee on Data Engineering.

Bischofs et al., "A Hierarchical Super Peer Network for Distributed Artifacts", retrieved Jul. 2010, pp. 1-10 http://se.informatik.uni-oldenburg.de/research/projects/epolos/index html/ HSPeerDSD2004.pdf.

Navas-Delgado et al., "Embedding Semantic Annotations into Dynamic Web Contents", Proceedings of the 15th International Workshop on Database and Expert Systems Appications (DEXA'04), IEEE 2004, pp. 1-5.

* cited by examiner

*Primary Examiner* — Thu-Nguyet Le
(74) *Attorney, Agent, or Firm* — Yee & Associates, P.C.; Diana R. Gerhardt

(57) ABSTRACT

The different illustrative embodiments provide a method, a computer program product, and an apparatus for managing information. A request to store text in a table in a database is received. A determination is made as to whether a first collection of textual information having a first concept that is related to a second concept for the text is present in the database responsive to receiving the request containing the text. The text is associated with the first collection of textual information in the database responsive to a determination that the first collection of textual information in the database having the first concept that is related to the second concept for the text is present in the database. A second collection for the data with a third concept that is related to the second concept for the text within the degree of relatedness is created.

19 Claims, 7 Drawing Sheets

MANAGING INFORMATION

BACKGROUND

1. Field

The disclosure relates generally an improved data processing system and in particular to a method and apparatus of managing information. Still more particularly, the present disclosure relates to a method and apparatus of managing databases.

2. Description of the Related Art

Databases are commonly used to store information for retrieval or processing. Databases are managed by a database management system. The database management system receives and stores data in the database. The database management system also performs queries on databases managed by the database management system to modify or retrieve particular information.

Databases are often organized in tables. Each table is composed of rows and columns. Each column in the table represents a particular type of information. For example, a database table for products sold at a store may have columns for the name of the product, the price, and the quantity available. Each row in the table is an entry in the table for a particular entity. The row contains values for the columns in the table. For example, a row in the table for products sold at a store may contain the text "potato chips" in the name column, $1.00 in the price column, and 20 in the quantity available. The database may then be queried or searched for a number of different conditions. For example, a query for items in the table that have a quantity available of 10 or above would return the potato chips row.

A database grows in size as more data is stored in the database. As database size grows, the speed with which the database may be queried decreases. The speed decreases because there is more data in the database that must be processed by the database management system to determine whether the row meets the criteria in the query. A query may be performed more quickly by reducing the number of records processed in performing the query. Splitting a table into two or more tables reduces the number of records processed in performing a query when fewer than all of the two or more tables split from the larger table are processed in performing the query.

Additionally, data may be added to the database. When data is added to the database, the data may not be closely related to the data in any particular table in the database. When the data is not related to the data in any particular table in the database, an administrator may create a new table to store the added data.

SUMMARY

The different illustrative embodiments provide a method, a computer program product, and an apparatus for managing information. A request to store text in a table in a database is received by a processing unit. The request contains the text. A determination is made as to whether a first collection of textual information having a first concept that is related to a second concept for the text is present in the database responsive to receiving the request containing the text. The first concept is related to the second concept when the first concept is within a degree of relatedness to the second concept. The text is associated, by the processing unit, with the first collection of textual information in the database responsive to a determination that the first collection of textual information in the database having the first concept that is related to the second concept for the text is present in the database. A second collection for the data with a third concept that is related to the second concept for the text within the degree of relatedness is created responsive to a determination that the first collection of textual information in the database having the first concept that is related to the second concept for the text is absent from the database.

DETAILED DESCRIPTION

Figure 1:
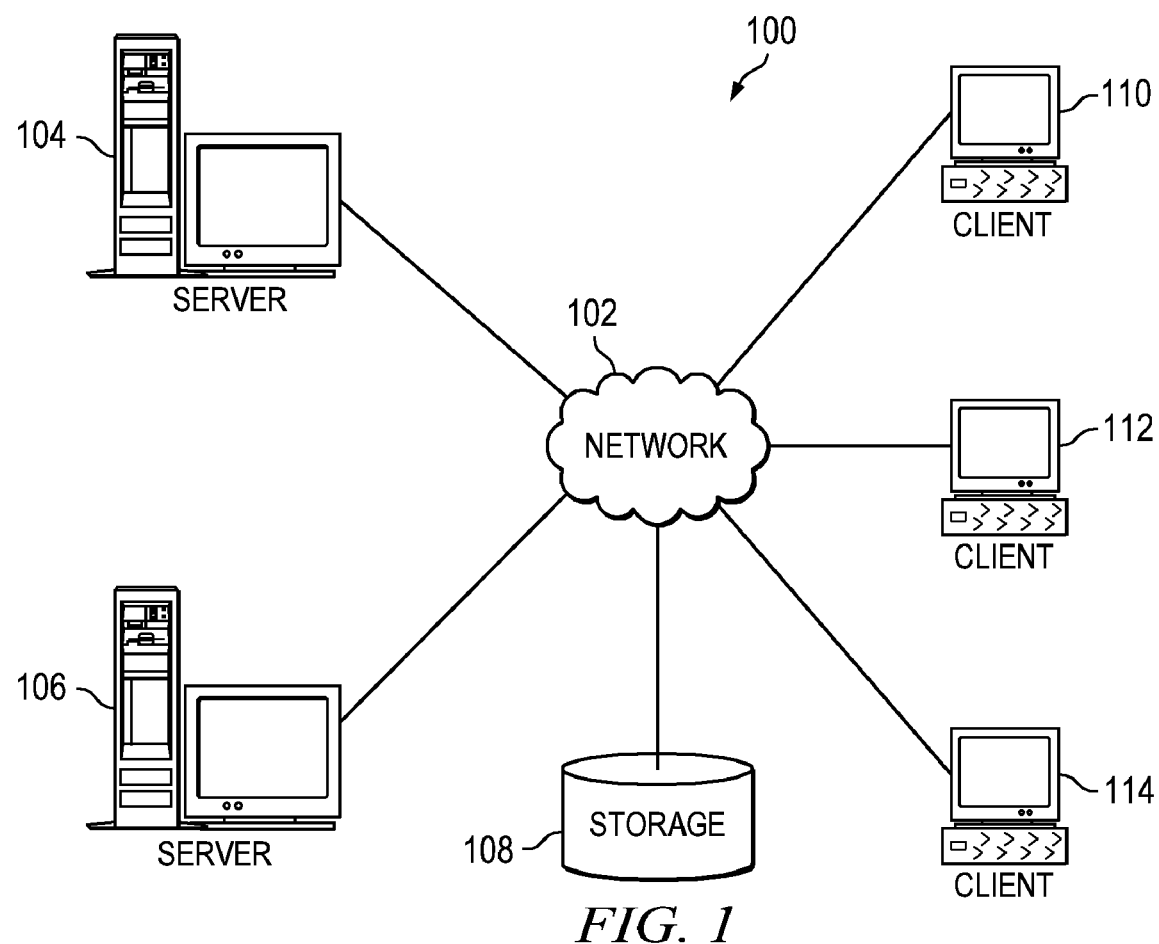
FIG. 1 is an illustration of a network data processing system depicted in accordance with an illustrative embodiment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including, but not limited to, wireless, wireline, optical fiber cable, RF, etc., or any suitable combination of the foregoing. Computer program code for carrying out operations for aspects of the present invention may be written in any combination of one or more programming languages, including an object-oriented programming language, such as Java, Smalltalk, C++, or the like and conventional procedural programming languages, such as the "C" programming language or similar programming languages.

The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowcharts and/or block diagrams of methods, apparatus (systems), and computer program products according to embodiments of the invention.

It will be understood that each block of the flowcharts and/or block diagrams and combinations of blocks in the flowcharts and/or block diagrams can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture, including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus, or other devices to produce a computer implemented process such that the instructions which operate on the computer or other programmable apparatus provide processes for implementing the functions/acts specified in the flowchart and/or block diagram block or blocks.

With reference now to the figures and in particular with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Computers in network data processing system 100, such as client computer 110 and server computer 104, implement illustrative embodiments to manage information. In these examples, a client computer, such as client computer 110, connects to a server computer, such as server computer 104. Client computer 110 then requests that information be stored in a database accessible to server computer 104. Server computer 104 runs a database management system. A database management system is software that stores data in a database and retrieves data from the database in response to a query for data matching particular criteria.

Server computer 104 receives the request containing the information from client computer 110 and performs a latent semantic analysis on each of the collections of textual information in the database and the information in the request. In some illustrative embodiments, results of previous latent semantic analyses performed on the collections of textual information is stored in the database. In such illustrative embodiments, the results of the previous latent semantic analyses are used in performing the latent semantic analysis on the information in the request. In these examples, each collection of textual information is stored as a table in the database. Each table in the database is also associated with at least one concept. A concept is a topic for a table that describes the contents of the table.

Latent semantic analysis is a process that identifies patterns in the relationships between the terms contained in a collection of text. Latent semantic analysis uses the principle that words that are used in the same contexts in the text tend to have similar meanings. Latent semantic analysis can generate one or more concepts from a collection of text. The one or more concepts are terms in the collection of text that are determined by the latent semantic analysis to represent the topic of the collection of text.

Thus, server computer 104 performs a latent semantic analysis on the information and the concept for each of the tables in the database to generate a degree of relatedness between the information from the request and each of the tables in the database. A request may be a request to store new content into the database, or a request to compare against content stored in the database. The degree of relatedness is a numeric value that represents how closely the information in the request is related to the particular concept. For example, "orange" has a higher degree of relatedness to "color" than "door."

Once the degree of relatedness is generated between the information in the request and the concept for each of the tables in the database, server computer 104 identifies the table in the database that has a concept that is within a specified degree of relatedness with the concept for the information in the request. If a table is identified, server computer 104 then associates the information in the request with the table having the concept with the highest degree of relatedness to the information in the request. In some illustrative embodiments, server computer 104 associates the information with the table by adding a row to the table containing the information. If no table is identified as having a concept that is related to the information in the request within the specified degree of relatedness, a new table is created to contain the information. In some illustrative embodiments, server computer 104 then associates one or more concepts for the information with the table.

In some illustrative embodiments, the tables are stored in a hierarchy. In illustrative embodiments in which the tables are stored in a hierarchy, server computer 104 compares the degree of relatedness between the information in the request and the concept for each of the tables at a first level of the hierarchy and identifies the table having a concept with a degree of relatedness that exceeds a specified degree of relatedness at the particular level of the hierarchy.

Server computer 104 then performs a latent semantic analysis on the information in the request and the concept for each of the tables at the second level of the hierarchy that are directly subordinate to the table at the first level of the hierarchy. Server computer 104 then identifies the table at the second level of the hierarchy that has a degree of relatedness that exceeds a specified degree of relatedness between the information and the concept for the table, as well as a higher degree of relatedness between the information and the concept for the table at the second level of the hierarchy than the degree of relatedness between the information and the concept for the superior table at the first level of the hierarchy.

Figure 2:
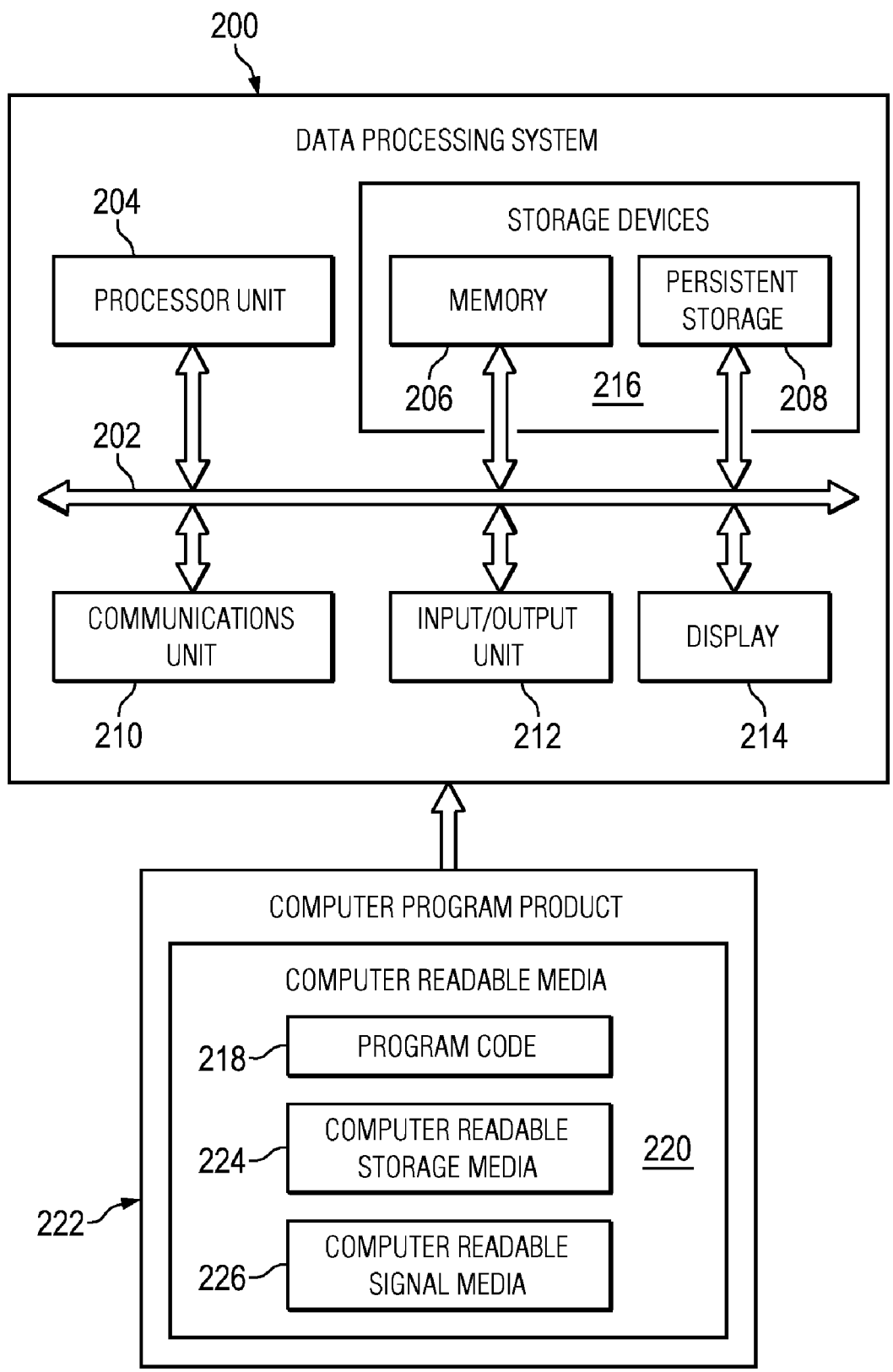
FIG. 2 is a diagram of a data processing system depicted in accordance with an illustrative embodiment.

Turning now to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214. Data processing system 200 is an example of a data processing system that can be used to implement server computers and client computers in network data processing system 100 in FIG. 1.

Processor unit 204 serves to execute instructions for software that may be loaded into memory 206. Processor unit 204 may be a number of processors, may be a multi-processor core, or some other type of processor, depending on the particular implementation. A "number", as used herein, with reference to an item, means "one or more items". Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200. In these illustrative examples, computer readable storage media 224 is a non-transitory computer readable storage media.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components, and/or may be comprised entirely of organic components, excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

The different illustrative embodiments recognize and take into account a number of different considerations. For example, the different illustrative embodiments recognize and take into account that creating groups of textual information from a data source, such as a table in a database, that are related within a particular degree of relatedness decreases the time used to perform a query for data in the data source. The time used to perform the query is decreased because the query is directed at tables containing records that are closely related to the search terms in the query, and therefore, likely to be in the result set for the query are processed. Additionally, tables containing records that are not closely related to the search terms in the query are not processed.

The different illustrative embodiments also recognize that creating tables for text that is not within a particular degree of relatedness of a concept of another table in the database reduces administration costs for a database because the configuration of the database may be altered without a human to identify a favorable alteration and make the alteration in the database.

Additionally, the database management system may reconfigure the database by reanalyzing data already stored in the database. In other words, the database management system may identify a collection of textual information in the database having a concept that has at least a particular degree of relatedness to text already stored in the database using a latent semantic analysis. The database management system may then remove the existing association for the text and create a new association for the text with the collection of textual information identified as having the particular degree of relatedness. In these examples, the database management system may remove the existing association and create the new association by removing the text from one table and inserting the text into another table. The reconfiguration of the database for data already stored in the database may be performed in response to a particular occurrence, such as a period of time, a number of database transactions, or an amount of disk space used by the database.

The different illustrative embodiments also recognize and take into account that available system resources may have an effect on the length of time for performing latent semantic analysis on the text and the concepts for the collections of textual information. When a small number of system resources are available, the semantic analysis may take longer than when a large number of system resources are available. For example, system resources may include processor and memory availability. The different illustrative embodiments recognize and take into account that using a degree of relatedness that corresponds to the number of available system resources reduces the amount of time taken to store the data in the database when few system resources are available. However, the degree of relatedness that corresponds to the number of available system resources may be increased when many system resources are available. The text is associated with a collection of textual information that is more related to the text when many system resources are available.

Thus, the different illustrative embodiments provide a method, a computer program product, and an apparatus for managing information. A request to store text in a table in a database is received by a processing unit. The request contains the text. A determination is made as to whether a first collection of textual information having a first concept that is related to a second concept for the text is present in the database responsive to receiving the request containing the text. The first concept is related to the second concept when the first concept is within a degree of relatedness to the second concept. The text is associated, by the processing unit, with the first collection of textual information in the database responsive to a determination that the first collection of textual information in the database having the first concept that is related to the second concept for the text is present in the database. A second collection for the data with a third concept that is related to the second concept for the text within the degree of relatedness is created responsive to a determination that the first collection of textual information in the database having the first concept that is related to the second concept for the text is absent from the database, creating, by the processing unit.

Figure 3:
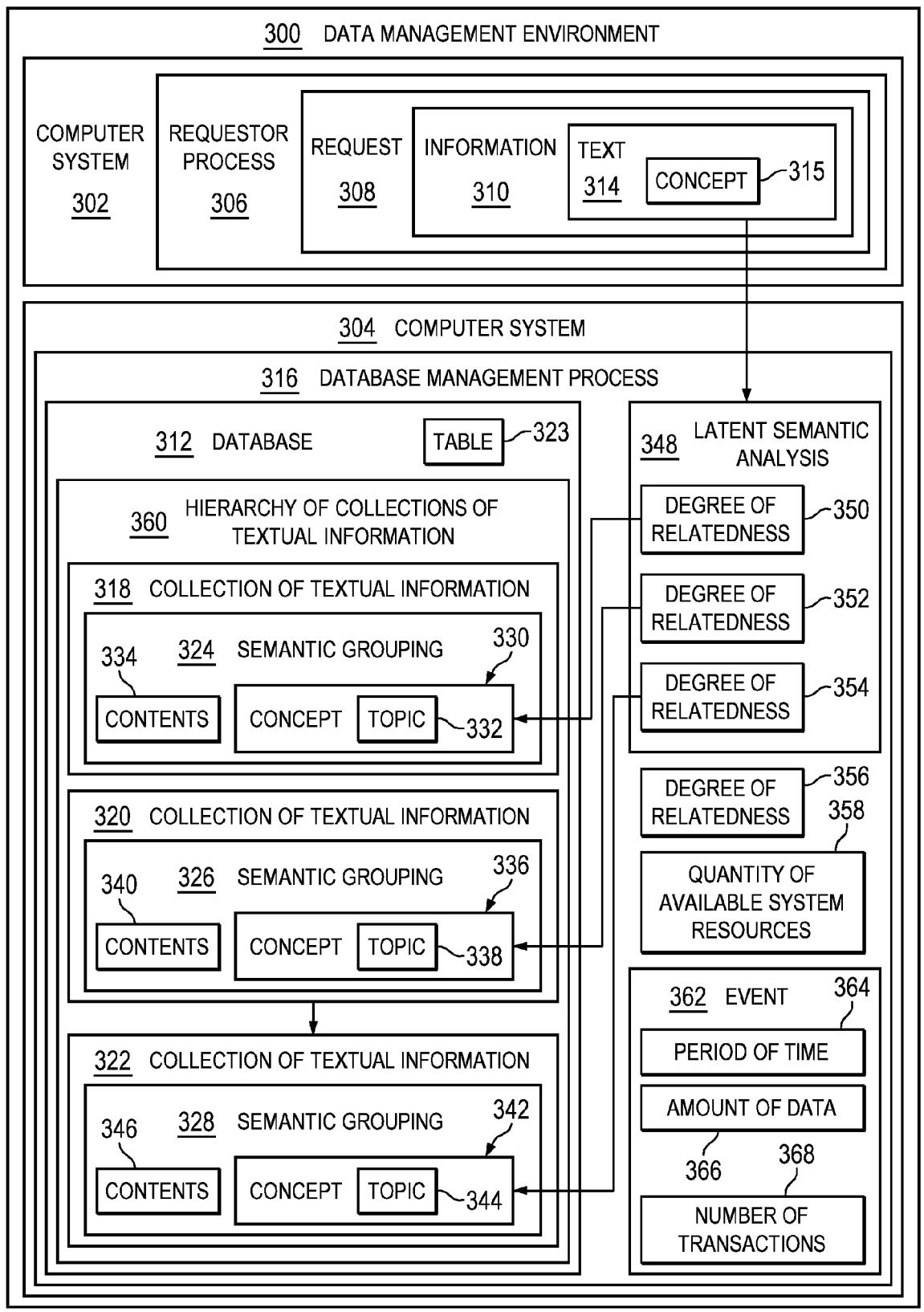
FIG. 3 is an illustration of a data management environment depicted in accordance with an illustrative embodiment.

Turning now to FIG. 3, an illustration of a data management environment in accordance with an illustrative embodiment. Data management environment 300 may be implemented in network data processing system 100 using client computer 110 and server computer 104 in FIG. 1. Of course, data management environment 300 may include additional client computers, server computers, and/or other suitable components.

Data management environment 300 contains computer system 302 and computer system 304. Computer system 302 is an example implementation of client computer 110 in FIG. 1. Computer system 304 is an example implementation of server computer 104 in FIG. 1. In these examples, computer system 302 and/or computer system 304 consist of a number of computers. A number of computers means one or more computers. Computer system 302 runs requestor process 306. Requestor process 306 is a software component that generates request 308 to store information 310 in table 323 in database 312 on computer system 304. For example, requestor process 306 may be a standard query language (SQL) client application. In these examples, information 310 consists of text 314. For example, request 308 may be a request to store the word "orange" in database 312. Of course, request 308 may also be a request to store a document or a larger quantity of text than one word.

Computer system 302 transmits request 308 and request 308 is received by computer system 304. Request 308 may be transmitted over a network, a direct connection between computer system 304 and computer system 302, or another suitable method of communication. Computer system 304 runs database management process 316. Database management process 316 manages database 312. In other words, database management process 316 stores data in database 312, processes queries for data stored in the database, and modifies configuration parameters of database 312.

Database 312 contains collections of textual information 318, 320 and 322. Collections of textual information 318, 320, and 322 are tables in database 312 in these examples. Collections of textual information 318, 320, and 322 may contain groupings of text contained in table 323. More specifically, collection of textual information 318 is a database table representing semantic grouping 324, collection of textual information 320 is a database table representing semantic grouping 326, and collection of textual information 322 is a database table representing semantic grouping 328.

Semantic grouping 324 is a collection of related text in table 323. First text is related to second text when the first text and the second text may be described using a concept that describes both the first text and the second text. In some illustrative embodiments, text is contained in semantic grouping 324 when first text is synonymous with second text in semantic grouping 324. Text is synonymous with other text when both the text and the other text describe the same idea. For example, "doctors" is synonymous with "physicians," because both words describe the idea of the profession of diagnosing and curing illness.

However, both first text and second text may not be contained in semantic grouping 324 when the first text and the second text are the same word but have a different meaning. For example, "tree," as used in the context of a plant, may not be in semantic grouping 324 when semantic grouping 324 contains "tree," as used in the context of the computer science programming data structure. Semantic grouping 326 is a collection of related text in collection of textual information 320, and semantic grouping 328 is a collection of related text in collection of textual information 322.

Semantic grouping 324 is described by concept 330. Concept 330 is text consisting of topic 332 for contents 334 of semantic grouping 324. In other words, concept 330 describes the idea that relates contents 334 of semantic grouping 324. Likewise, semantic grouping 326 is described by concept 336. Concept 336 is text consisting of topic 338 for contents 340 of semantic grouping 326. Concept 330 describes the idea that relates contents 340 of semantic grouping 326. Additionally, semantic grouping 328 is described by concept 342. Concept 342 is text consisting of topic 344 for contents 346 of semantic grouping 328. Concept 342 describes the idea that relates contents 346 of semantic grouping 328. For example, concept 342 may be "colors" when contents 346 contain "orange", "blue", and "green."

Database management process 316 generates concept 315 for text 314. Database management process 316 generates concept 315 by identifying a topic that describes the contents of text 314. Database management process 316 then performs latent semantic analysis 348 between concept 315 and each of concept 330, 336, and 342. Latent semantic analysis is an algorithm that identifies patterns in the relationships between the terms contained in a collection of text. Latent semantic analysis uses the principle that words that are used in the same contexts in the text tend to have similar meanings. For example, latent semantic analysis 348 may be performed by using singular value decomposition (SVD). Computer system 304 performs latent semantic analysis 348 on concept 315 and concepts 330, 336, and 342 to generate degrees of relatedness 350, 352, and 354. Degree of relatedness 350 is a numeric value that represents how closely concept 315 is related to concept 330. Likewise, degree of relatedness 352 is a numeric value that represents how closely concept 315 is related to concept 336, and degree of relatedness 354 is a numeric value that represents how closely concept 315 is related to concept 342.

Computer system 304 running database management process 316 then determines which of degrees of relatedness 350, 352, and 354 meet or exceed degree of relatedness 356. Degree of relatedness 356 is a value configured in database management process 316 that represents the minimum degree for concept 315 to be considered related to concept 330, 336, or 342. In some illustrative embodiments, degree of relatedness 356 is configured by a user.

However, in other illustrative embodiments, degree of relatedness 356 is configured and updated by database management process in response to changes in quantity of available system resources 358. More specifically, database management process 316 increases degree of relatedness 356 as quantity of available system resources 358 on computer system 304 increases, and database management process 316 decreases degree of relatedness 356 as quantity of available system resources 358 on computer system 304 decreases. In such illustrative embodiments, a user may configure maximum and minimum values for degree of relatedness 356.

Database management process 316 increases or decreases degree of relatedness 356 because latent semantic analysis 348 uses more system resources to identify a greater degree of relatedness than a lesser degree of relatedness.

In some illustrative embodiments, database management process 316 stores text 314 in table 323. Additionally, database management process 316 associates text 314 with the collection among collection of textual information 318, 320, and 322 with a degree of relatedness that meets or exceeds degree of relatedness 356. In these examples, database management process 316 associates text 314 with the collection by storing text 314 in the table representing the collection, such as collection of textual information 318. In another illustrative example, none of collections of textual information 318, 320, and 322 meet or exceed degree of relatedness 356. In such an illustrative example, database management process 316 creates an additional collection of textual information to contain text 314. Concept 315 is used as the concept for the new collection of textual information.

In other illustrative embodiments, however, collections of textual information 318, 320, and 322 are stored in hierarchy of collections of textual information 360. Hierarchy of collections of textual information 360 is an ordering of collections of textual information 318, 320, and 322 such that particular collections may be subordinate to another collection. For example, collection of textual information 322 is subordinate to collection of textual information 320. Collection of textual information 322 is subordinate to collection of textual information 320 because concept 342 is a subcategory of concept 336. For example, concept 336 may be "medical professionals," and concept 342 may be "doctors."

In some illustrative embodiments, database management process 316 monitors for the occurrence of event 362. When event 362 occurs, database management process 316 reorganizes database 312 by deleting collections of textual information 318, 320, and 322, and generating new collections of textual information from the text in table 323. In other words, database management process 316 generates concepts for the words in table 323, performs latent semantic analysis 348 on the words and any existing collections of textual information, and associates the text in table 323 with a collection of textual information that meets or exceeds degree of relatedness 356. In such illustrative embodiments, database management process 316 may regroup text into different collections with a higher or lower degree of relatedness. Event 362 may be period of time 364, amount of data 366 in table 323, or number of transactions 368 for database 312.

The illustration of computer system 302 and computer system 304 in data management environment 300 is not meant to imply physical or architectural limitations to the manner in which different features may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in illustrative embodiments in which database management process 316 monitors for the occurrence of event 362, database management process 316 may not delete collections of textual information 318, 320, and 322. Instead, database management process 316 may modify collections of textual information 318, 320, and 322 by moving text to another collection of textual information with a higher degree of relatedness than the collection of textual information presently associated with the text.

Additionally, database 312 may be located at a computer system other than computer system 304. In such an illustrative embodiment, computer system 304 may communicate with database 312 over a network. In illustrative embodiments in which database 312 contains hierarchy of collections of textual information 360, database management process 316 may associate collection of textual information 322 with collection of textual information 320 as a subordinate collection in hierarchy of collections of textual information when concept 342 is encompassed by concept 336. For example, concept 336 may be "medical professionals" and concept 342 may be "doctors."

Figures 4, 5, 6:
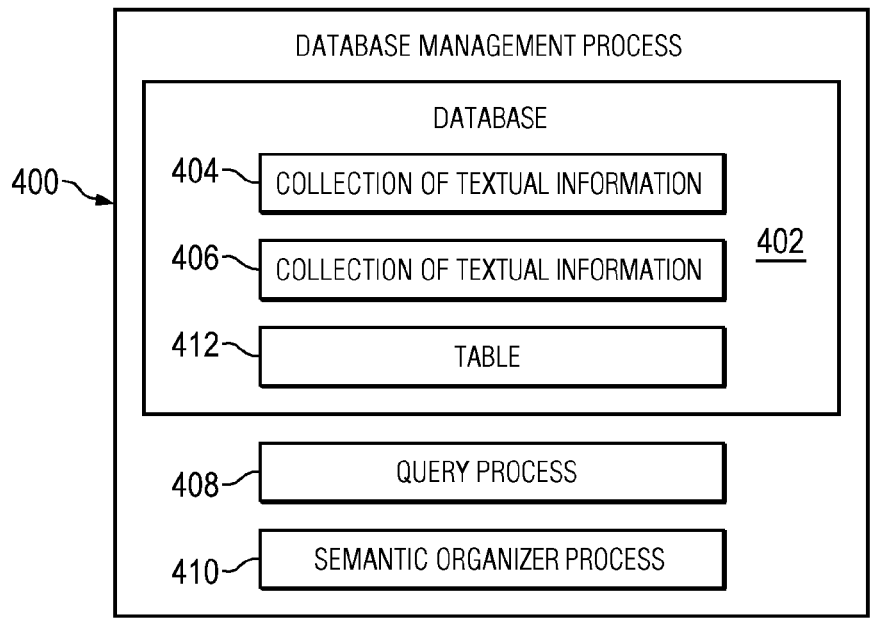
FIG. 4 is an illustration of a database management process depicted in accordance with an illustrative embodiment.
FIG. 5 is an illustration of a collection of textual information depicted in accordance with an illustrative embodiment.
FIG. 6 is an illustration of a concept with a singular value decomposition depicted in accordance with an illustrative embodiment.

Turning now to FIG. 4, an illustration of a database management process is depicted in accordance with an illustrative embodiment. Database management process is an example implementation of database management process 316 in FIG. 3.

Database management process 400 contains database 402 in this illustrative embodiment. Database 402 contains collection of textual information 404 and collection of textual information 406. In this illustrative embodiment, database management process also runs query process 408 in response to receiving a request for data in database 402. More specifically, database management process 400 receives a request for data in database 402 and runs query process 408 to locate the records in database 402 that match the query.

Database management process 400 also runs semantic organizer process 410. Semantic organizer process 410 generates collections of textual information 404 and 406 from table 412 in database 402 responsive to an occurrence of an event, such as event 362 in FIG. 3. Semantic organizer process 410 performs a latent semantic analysis on the concepts generated for the text in table 412. Semantic organizer process 410 then identifies collections of textual information 404 and 406 that meet or exceed a particular degree of relatedness configured in database management process 400, such as degree of relatedness 356. Semantic organizer process 410 then associates the text with the collection of textual information that meets or exceeds the particular degree of relatedness.

Looking specifically at FIG. 5, an illustration of a collection of textual information is depicted in accordance with an illustrative embodiment. Collection of textual information 500 is an example implementation of collection of textual information 318 in FIG. 3. In these examples, collection of textual information 500 takes the form of a table in a database.

Collection of textual information 500 contains concept column 502, first dimension column 504, second dimension column 506, and third dimension column 508. Concept column 502 contains the concepts in collection of textual information 500. Concept column 502 is an example implementation of concept 330 in FIG. 3. In this illustrative example, collection of textual information 500 may be represented with a single concept or multiple concepts from concept column 502. A weighting algorithm may be used on the values in concept column 502 to determine a priority for concepts that may be used to represent the contents of collection of textual information 500.

The values in first dimension column 504, second dimension column 506, and third dimension column 508 represent values generated by performing a latent semantic analysis on the concepts in concept column 502. In this illustrative example, collection of textual information 500 was generated by performing a latent semantic analysis on one or more tables in the database that contain the terms to be processed. A matrix is generated that contains values for the number of times each of the terms appeared in the table. In these examples, the values are calculated using term frequency-inverse document frequency. Term frequency-inverse document frequency (TFIDF) is a weighting formula defined as the following:

$$TFIDF_{i,j}=(N_{i,j}/N_{*,j})* \log (DD_i),$$

where $N_{i,j}$ is the number of times word I appears in table j, $N_{*,j}$ is the number of total words in the table j, D is the number of tables, and $D_i$ is the number of tables in which word i appears.

The matrix is then processed using single value decomposition (SVD) to reduce the dimensional representation of the matrix and reduce noise. In one illustrative embodiment, the single value decomposition of the matrix is performed by making a function call to a library routine for generating SVD values. Performing the single value decomposition calculation on the matrix generates the values in first dimension column 504, second dimension column 506, and third dimension column 508.

Turning now to FIG. 6, an illustration of a concept with a singular value decomposition is depicted in accordance with an illustrative embodiment. Concept 602 is an example implementation of concept 315 in FIG. 3. Concept 602 is a concept representing text to be stored in the database containing table 500. In this illustrative example, concept 602 is "video."

A latent semantic analysis is performed on concept 602 to generate first dimension value 604, second dimension value 606, and third dimension value 608. A degree of relatedness between concept 602 and one or more concepts in table 500 is identified. In this illustrative example, third dimension value 608 is compared with the value in third dimension column 508 for the first concept in concept column 502, that is, "computer." If the difference between the third dimension values is less than 0.25, the concepts are designated as related. Of course, in other illustrative embodiments, first and/or second and/or third dimension values may be compared to determine whether the concepts are related. Additionally, the value 0.25 is exemplary in nature and any suitable value may be used. In one illustrative embodiment, the value is selected by a user.

Additionally, values for concept 602 may be compared to multiple concepts in table 500. In such illustrative embodiments, concept 602 may be designated as related to the concepts in table 500 when the average difference between second dimension value 606 and the values in second dimension column 506 is less than a particular value. Of course, any suitable condition may be used to determine whether the concepts are to be designated as related.

Figure 7:
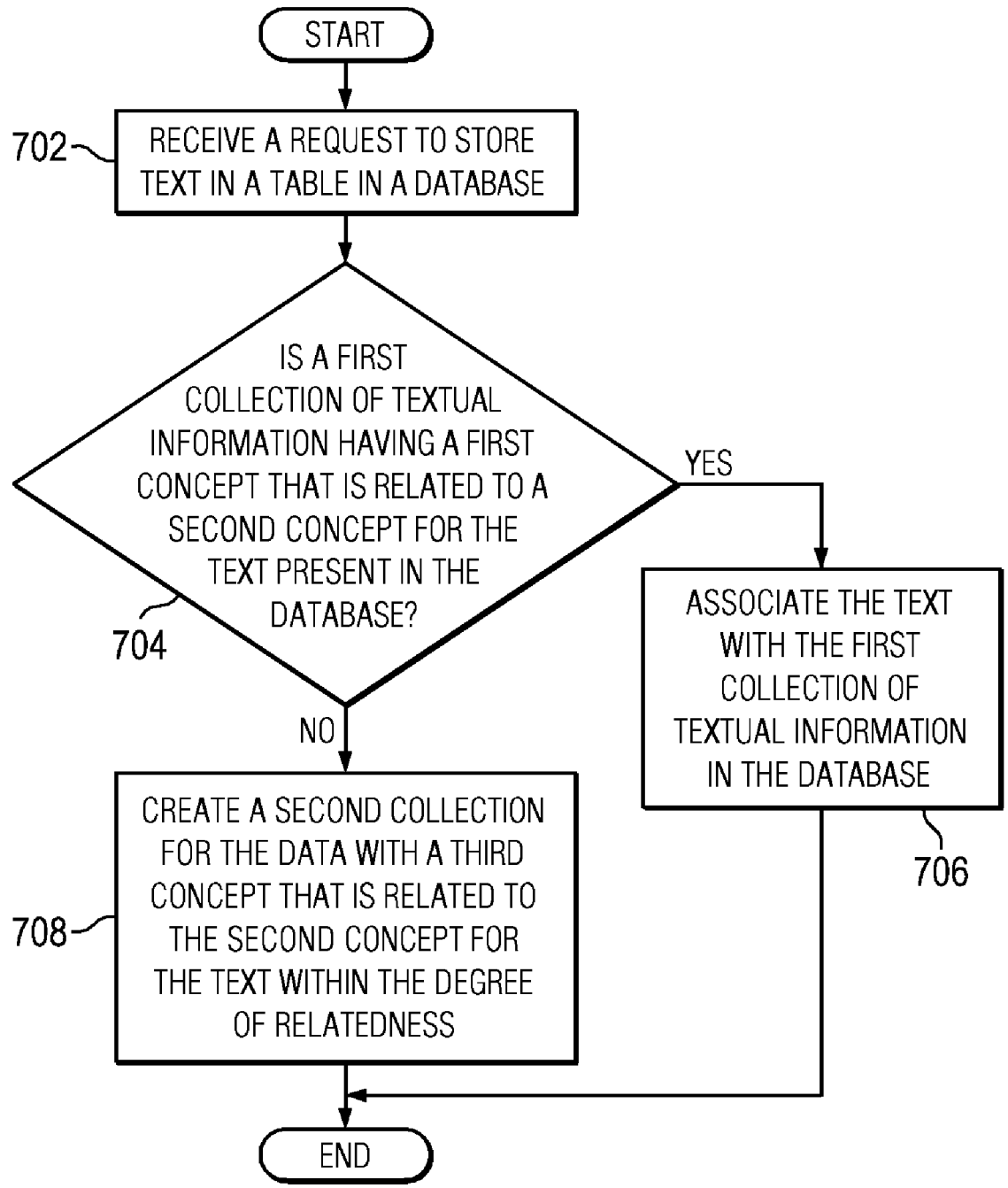
FIG. 7 is a flowchart of a process for managing information depicted in accordance with an illustrative embodiment.

Turning now to FIG. 7, a flowchart of a process for managing information is depicted in accordance with an illustrative embodiment. The process may be performed by database management process 316 running on computer system 304 in FIG. 3.

The process begins by receiving a request to store text in a table in a database (step 702). The process then determines whether a first collection of textual information having a first concept that is related to a second concept for the text is present in the database (step 704). First text is related to second text when the first text and the second text may be described using a concept that describes both the first text and the second text. In some illustrative embodiments, first and second text are related when first text is synonymous with second text. First text is synonymous with second text when both the first text and the second text describe the same idea. For example, "doctors" is synonymous with "physicians" because both words describe the idea of the profession of diagnosing and curing illness. A concept is text consisting of a topic for the contents of the collection of textual information or the text.

The process may identify the collection of textual information having the first concept that is related to the second concept for text within the degree of relatedness by performing a latent semantic analysis on the first and second concepts. Latent semantic analysis is an algorithm that identifies patterns in the relationships between the terms contained in a collection of text. Latent semantic analysis uses the principle that words that are used in the same contexts in the text tend to have similar meanings. For example, latent semantic analysis may be performed by singular value decomposition (SVD). The latent semantic analysis is performed on the first concept and the second concepts to generate a degree of relatedness. The degree of relatedness is a numeric value that represents how closely the first concept is related to the second concept.

If the process determines that the first collection of textual information exists in the database at step 704, the process associates the text with the first collection of textual information in the database (step 706). In some illustrative embodiments, the process associated with text with the first collection of textual information by storing the text in a table containing the first collection of textual information. The second concept for the text may be stored in the table, in metadata for the table, in another table, or another suitable location. The process terminates thereafter.

If the process determines that the first collection of textual information is absent from the database at step 704, the process creates a second collection for the data with a third concept that is related to the second concept for the text within the degree of relatedness (step 708). The process terminates thereafter.

Figure 8:
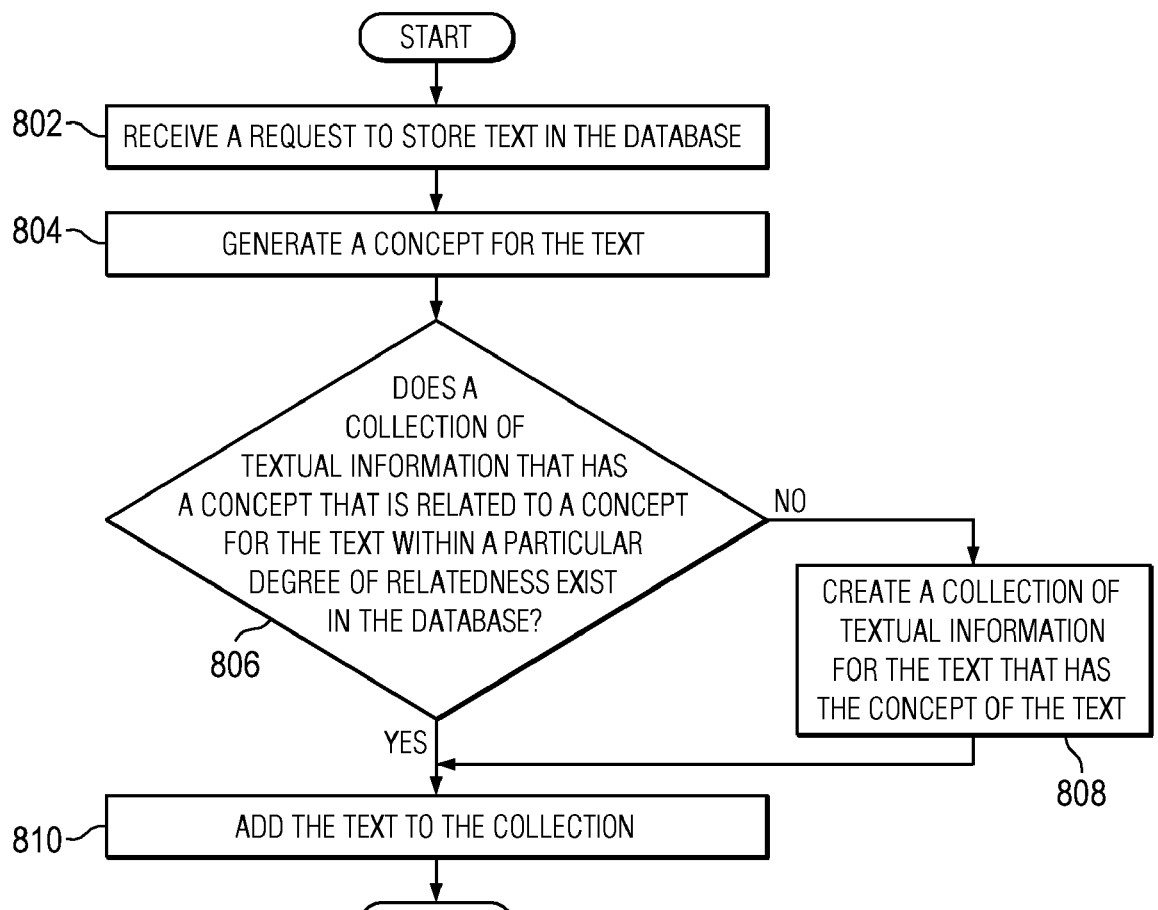
FIG. 8 is a flowchart of a process for storing text depicted in accordance with an illustrative embodiment.

Looking now to FIG. 8, a flowchart of a process for storing text is depicted in accordance with an illustrative embodiment. The process may be performed by database management process 316 running on computer system 304 in FIG. 3.

The operation begins by receiving a request to store text in the database (step 802). The process then generates a concept for the text (step 804). The process generates a concept by performing a latent semantic analysis on the text to identify the terms used in the text. In some illustrative embodiments, the term used most frequently in the text is selected as the concept. In other illustrative embodiments, multiple concepts are generated for the text. In yet other illustrative embodiments, a portion of the terms in the text are designated as concepts for the text. The terms may be a particular number of most frequently used terms in the text, or another suitable criteria.

The process then determines whether a collection of textual information that has a concept that is related to a concept for the text within a particular degree of relatedness exists in the database (step 806). The process performs a latent semantic analysis on the concept for each collection of textual information in the database and the concept for the text in order to generate the degree of relatedness. The degree of relatedness may be compared to a degree of relatedness configured in the database management system that is the minimum value for which the concepts are considered related.

If the process determines that the collection does not exist at step 806, the process creates a collection of textual information for the text that has the concept of the text (step 808). The process then proceeds to step 810. If the process determines that the collection exists at step 806, the process adds the text to the collection (step 810). The process terminates thereafter.

Figure 9:
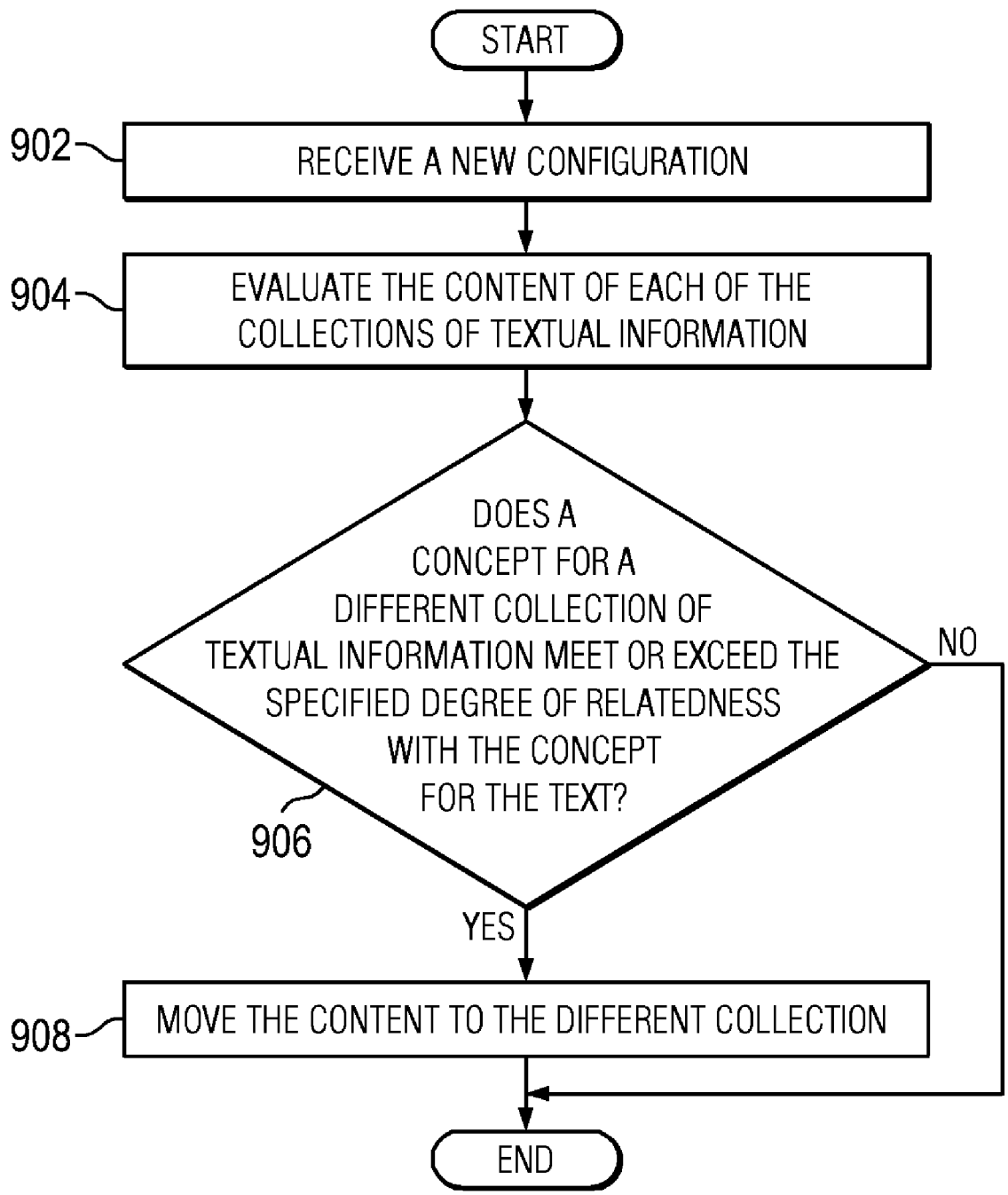
FIG. 9 is a flowchart of a process for reorganizing the collections of textual information depicted in accordance with an illustrative embodiment.

Turning now to FIG. 9, a flowchart of a process for reorganizing the collections of textual information is depicted in accordance with an illustrative embodiment. The process may be performed by database management process 316 running on computer system 304 in FIG. 3.

The process begins by receiving a new configuration (step 902). In these examples, the new configuration is a new degree of relatedness to use in generating the collections of textual information. The process then evaluates the content of each of the collections of textual information (step 904). The process evaluates the content of each of the collections of textual information by generating a concept for the content and performing a latent semantic analysis on the concept for the content and each of the concepts for the other collections of textual information.

The process then determines whether a concept for a different collection of textual information meets or exceeds the specified degree of relatedness with the concept for the text (step 906). The process generates the degree of relatedness by performing a latent semantic analysis on the concept for the different collection of textual information and the concept for the text. In some illustrative embodiments, the process performs a single value decomposition (SVD) to generate one or more values that represents the degree of relatedness. If the process determines that the concept for the different collection of textual information meets or exceeds the specified degree of relatedness with the concept for the text, the process moves the content to the different collection (step 908). In these examples, the process removes the content from the current table and adds the data to the table representing the different collection. The process terminates thereafter.

If the process determines that the concept for the collection does not meet or exceed the specified degree of relatedness with the concept for the text at step 906, the process terminates.

The flowchart and block diagrams in the different depicted embodiments illustrate the architecture, functionality, and operation of some possible implementations of apparatus and methods in different illustrative embodiments. In this regard, each block in the flowchart or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, the process may delete the collection at step 908 if no other content is present in the collection. Additionally, if the different collection has a concept with a degree of relatedness with the concept for the content that meets or exceeds the specified degree of relatedness at operation 906, the process may identify a degree of relatedness between the concept for the content and the concept for the present collection of the content. In such an illustrative embodiment, the process may not perform step 908 when the degree of relatedness between the concept of the content and the concept of the present collection is greater than between the concept of the content and the concept of the different collection.

Thus, the different illustrative embodiments allow for costs to be reduced in database administration and performance to be increased. Semantic groupings are generated for the text in a table either at the occurrence of an event or when data is added to the table. The semantic groupings allow the table to be searched more quickly than searching the entire table. The semantic groupings also allow a user to search for a term and retrieve synonymous terms located in the same collection, and not have terms with the same spelling but a different meaning in the context of the content returned for the search query. Costs of maintaining the database are also reduced because data to be stored in the database is stored in the table that contains data related to the data to be stored. The table is identified by performing a latent semantic analysis on the data in the table and the data to be stored. When no table in the database is related to the data to be stored within a particular degree of relatedness, a new table is created to contain the data.

Additionally, the different illustrative embodiments allow the database to be automatically reorganized after an event occurs, such as a period of time. The database is reorganized by performing a latent semantic analysis on the data in the database. New concepts are generated and each of the entries in the database are added to a table that has at least one concept within a particular degree of relatedness to the entry. If a table with such a degree of relatedness does not exist in the database, a new table is created for the entry.

Thus, the different illustrative embodiments provide a method, a computer program product, and an apparatus for managing information. A request to store text in a table in a database is received by a processing unit. The request contains the text. A determination is made as to whether a first collection of textual information in the database having a first concept that is related to a second concept for the text is present in the database responsive to receiving the request containing the text. The first concept is related to the second concept when the first concept is within a degree of relatedness to the second concept. The text is associated, by the processing unit, with the first collection of textual information in the database responsive to a determination that the first collection of textual information in the database having the first concept that is related to the second concept for the text is present in the database. A second collection for the data with a third concept that is related to the second concept for the text within the degree of relatedness is created responsive to a determination that the first collection of textual information in the database having the first concept that is related to the second concept for the text is absent from the database, creating, by the processing unit.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing information in a computer system, the method comprising:
    (a) the computer receiving a request to store text in a table in a database, wherein the request contains the text;
    (b) the computer responsive to receiving the request containing the text, determining whether a first collection of textual information having a first concept that is related to a second concept for the text is present in the database, wherein the first concept is related to the second concept when the first concept is within a degree of relatedness to the second concept, wherein step (b) comprises:
        identifying, by the processing unit, a quantity of available resources for a data processing system in which the processor unit is located; and
        selecting, by the processing unit, the degree of relatedness based on the quantity of available resources such that the degree of relatedness increases as the quantity of available resources increases and decreases as the quantity of available resources decreases;
    (c) the computer, responsive to a determination that the first collection of textual information in the database having the first concept that is related to the second concept for the text is present in the database, associating the text with the first collection of textual information in the database; and
    (d) the computer, responsive to a determination that the first collection of textual information in the database having the first concept that is related to the second concept for the text is absent from the database, creating a second collection for the data with a third concept that is related to the second concept for the text within the degree of relatedness.

2. The method of claim 1, wherein the first concept is a first topic that describes first contents of the first collection of the textual information, and the second concept is a second topic that describes second contents of the text.

3. The method of claim 1, wherein the first collection of textual information is a semantic grouping, and wherein step (b) comprises:
    performing, by the processing unit, a latent semantic analysis on the first concept and second concept, wherein the latent semantic analysis results in at least the degree of relatedness between the first concept and the second concept.

4. The method of claim 1, wherein the first collection is within a hierarchy of collections of textual information.

5. The method of claim 4, wherein the degree of relatedness is a first degree of relatedness, and further comprising:
    responsive to a determination that the first collection of textual information in the database having the first concept that is related to the second concept for the text is present in the database, determining, by the processing unit, whether a third collection of textual information subordinate to the first collection of textual information in the hierarchy having a fourth concept related to the text within a second degree of relatedness is present in the database, wherein the second degree of relatedness is greater than the first degree of relatedness.

6. The method of claim 5 further comprising:
associating the text with the third collection of textual information in the database.

7. The method of claim 1, wherein step (b), step (c), and step (d) are performed responsive to an expiration of a period of time.

8. The method of claim 1, wherein step (b), step (c), and step (d) are performed responsive to an event occurring, wherein the event is selected from a group comprising storing an amount of data in the database and a number of transactions occurring.

9. The method of claim 1, wherein the first collection of textual information is stored in a table in the database, and step (c) comprises:
storing the text and the second concept in the table with the first collection of textual information in the database.

10. A computer program product comprising:
(a) a computer readable storage medium;
(b) program code, stored on the computer readable storage medium for receiving a request to store text in a table in a database, wherein the request contains the text;
(c) program code, stored on the computer readable storage medium for determining whether a first collection of textual information having a first concept that is related to a second concept for the text is present in the database responsive to receiving the request containing the text, wherein the first concept is related to the second concept when the first concept is within a degree of relatedness to the second concept, wherein program code (c) comprises:
program code, stored on the computer readable storage medium for identifying a quantity of available resources for a data processing system in which the processor unit is located; and
program code, stored on the computer readable storage medium for selecting the degree of relatedness based on the quantity of available resources such that the degree of relatedness increases as the quantity of available resources increases and decreases as the quantity of available resources decreases;
(d) program code, stored on the computer readable storage medium for, associating the text with the first collection of textual information in the database responsive to a determination that the first collection of textual information in the database having the first concept that is related to the second concept for the text is present in the database; and
(e) program code, stored on the computer readable storage medium for creating, by the processing unit, a second collection for the data with a third concept that is related to the second concept for the text within the degree of relatedness responsive to a determination that the first collection of textual information in the database having the first concept that is related to the second concept for the text is absent from the database.

11. The computer program product of claim 10, wherein the first concept is a first topic that describes first contents of the collection of the textual information, and the second concept is a second topic that describes second contents of the text.

12. The computer program product of claim 10, wherein the first collection of textual information is a semantic grouping, and wherein program code (c) comprises:
program code, stored on the computer readable storage medium for performing, by the processing unit, a latent semantic analysis on the first concept and second concept, wherein the latent semantic analysis results in at least the degree of relatedness between the first concept and the second concept.

13. The computer program product of claim 10, wherein the first collection is within a hierarchy of collections of textual information.

14. The computer program product of claim 13, wherein the degree of relatedness is a first degree of relatedness, and further comprising:
program code, stored on the computer readable storage medium for determining, by the processing unit, whether a third collection of textual information subordinate to the first collection of textual information in the hierarchy having a fourth concept related to the text within a second degree of relatedness is present in the database, wherein the second degree of relatedness is greater than the first degree of relatedness responsive to a determination that the first collection of textual information in the database having the first concept that is related to the second concept for the text is present in the database.

15. The computer program product of claim 13, further comprising:
program code, stored on the computer readable storage medium for associating the text with the third collection of textual information in the database responsive to a determination that the third collection of textual information subordinate to the first collection of textual information in the hierarchy in the hierarchy having the fourth concept related to the text within the second degree of relatedness is present in the database.

16. The computer program product of claim 10, wherein program code (c), program code (d), and program code (e) are run responsive to an expiration of a period of time.

17. The computer program product of claim 10, wherein program code (c), program code (d), and program code (e) are performed responsive to an event occurring, wherein the event is selected from a group comprising storing an amount of data in the database and a number of transactions occurring.

18. An apparatus comprising:
a bus system;
a storage device connected to the bus system, wherein the storage device includes program code;
a processor unit connected to the bus system;
program code stored in the storage device for execution by the processor unit for receiving a request to store text in a table in a database, wherein the request contains the text;
program code stored in the storage device for execution by the processor unit for determining, responsive to receiving the request containing the text, whether a first collection of textual information having a first concept that is related to a second concept for the text is present in the database, wherein the first concept is related to the second concept when the first concept is within a degree of relatedness to the second concept, wherein determining whether a first collection of textual information having a first concept that is related to a second concept for the text is present in the database comprises:
program code stored in the storage device for execution by the processor unit for identifying a quantity of available resources for a data processing system in which the processor unit is located; and
program code stored in the storage device for execution by the processor unit for selecting the degree of relatedness based on the quantity of available resources such that the degree of relatedness increases as the quantity of available resources increases and decreases as the quantity of available resources decreases;

program code stored in the storage device for execution by the processor unit via at least one memory for associating, responsive to a determination that the first collection of textual information in the database having the first concept that is related to the second concept for the text is present in the database, the text with the first collection of textual information in the database;

program code stored in the storage device for execution by the processor unit via at least one memory for creating, responsive to a determination that the first collection of textual information in the database having the first concept that is related to the second concept for the text is absent from the database, a second collection for the data with a third concept that is related to the second concept for the text within the degree of relatedness.

19. The apparatus of claim 18, wherein the first concept is a first topic that describes first contents of the collection of the textual information, and the second concept is second topic that describes a second contents of the text.

* * * * *